July 29, 1924.

C. GUERITEY

SPOUT SOLDERING MACHINE

Filed Aug. 16, 1922    7 Sheets-Sheet 2

1,502,773

INVENTOR
Charles Gueritey
BY
P. F. Bourne
ATTORNEY

July 29, 1924.

C. GUERITEY

SPOUT SOLDERING MACHINE

Filed Aug. 16, 1922   7 Sheets-Sheet 4

1,502,773

INVENTOR
Charles Gueritey.
BY
ATTORNEY

July 29, 1924.
C. GUERITEY
1,502,773
SPOUT SOLDERING MACHINE
Filed Aug. 16, 1922   7 Sheets-Sheet 6

INVENTOR
Charles Gueritey.
BY
T. F. Bourne
ATTORNEY

Patented July 29, 1924.

1,502,773

UNITED STATES PATENT OFFICE.

CHARLES GUERITEY, OF PASSAIC, NEW JERSEY, ASSIGNOR TO PASSAIC METAL WARE CO., OF PASSAIC, NEW JERSEY, A CORPORATION OF NEW JERSEY.

SPOUT-SOLDERING MACHINE.

Application filed August 16, 1922. Serial No. 582,132.

*To all whom it may concern:*

Be it known that I, CHARLES GUERITEY, a citizen of the United States, and resident of Passaic, in the county of Passaic and State of New Jersey, have invented certain new and useful Improvements in Spout-Soldering Machines, of which the following is a specification.

The object of my invention is to provide means to assemble articles together, such as caps and spouts and solder them together in a successive and expeditious manner.

In carrying out my invention I provide means to supply articles to be assembled, such as caps and spouts, and present corresponding caps and spouts successively in assembling position, with means to insert the spouts into the caps, solder the spouts and caps together, discharge any excess solder on the caps and spouts, and discharge the completed articles from the machine.

My invention further comprises novel details of improvement and combinations of parts that will be more fully hereinafter set forth and then pointed out in the claims.

Reference is to be had to the accompanying drawings forming part hereof, wherein.

Similar numerals of reference indicate corresponding parts in the several views.

Figure 1:
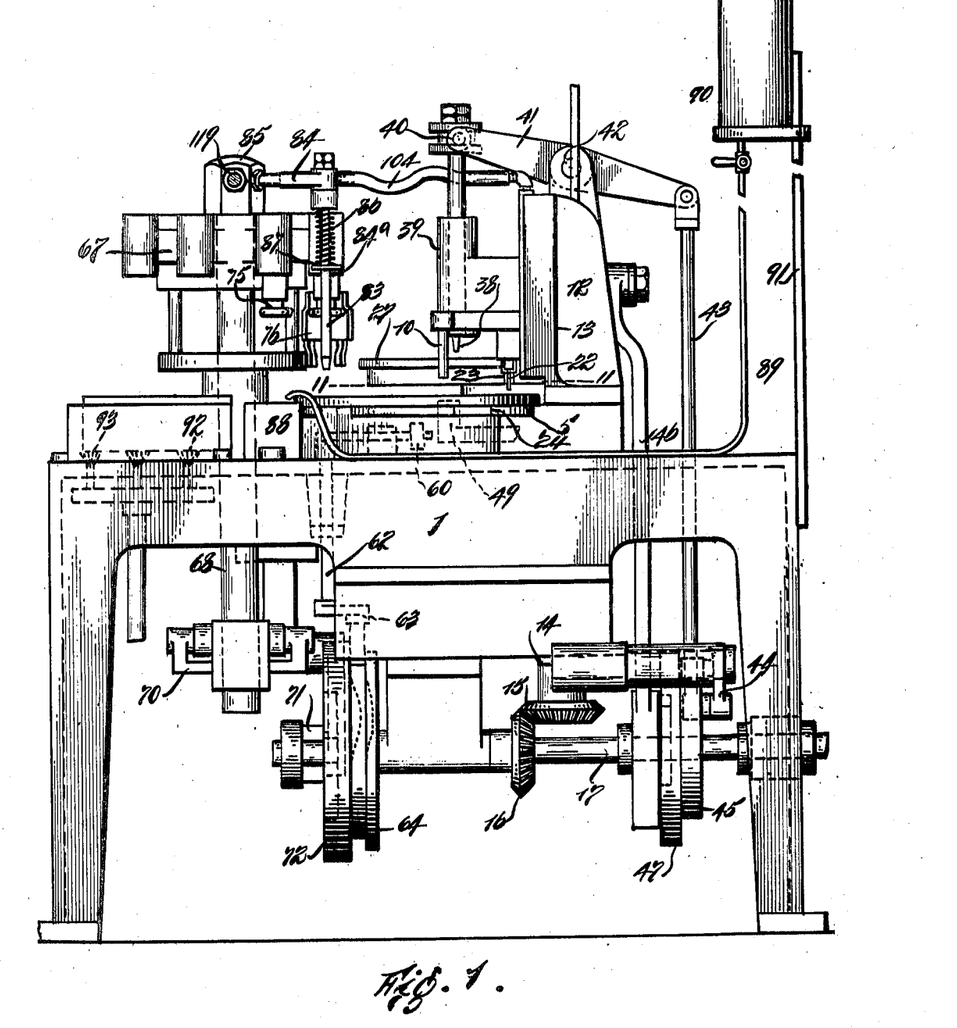
Fig. 1 is a front elevation of a machine embodying my invention, some parts being omitted.
Figures 3, 26, 27, 32:
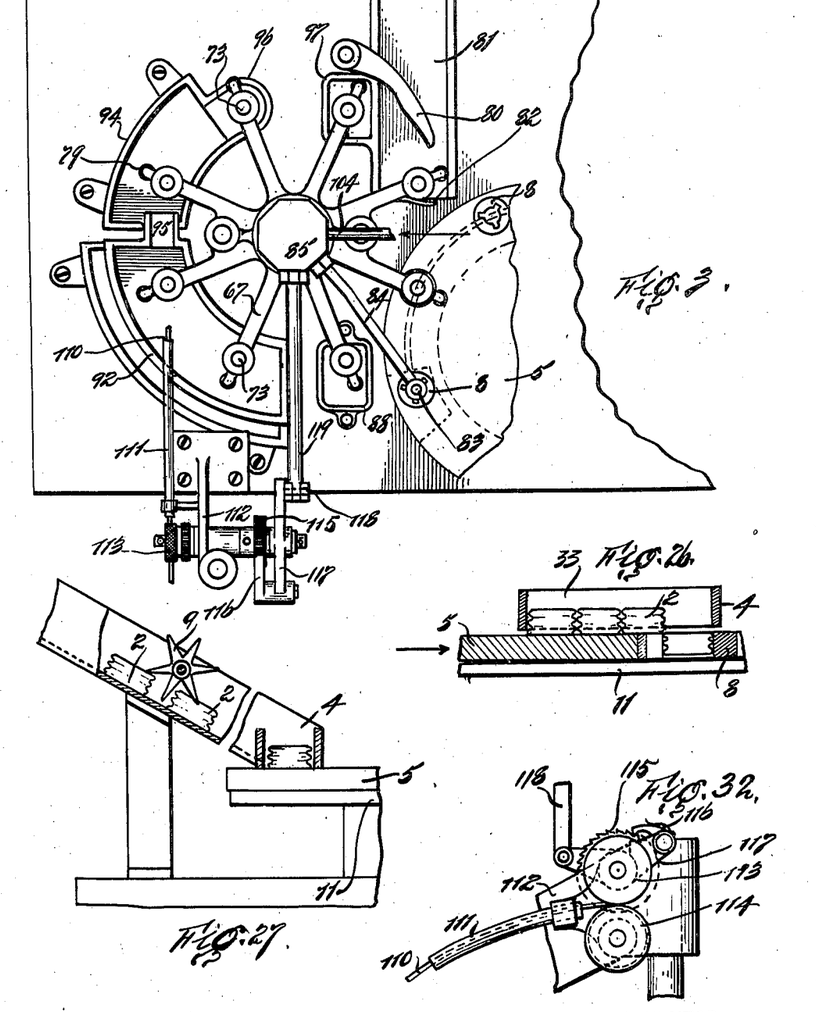
Fig. 3 is a fragmentary plan view, illustrating the spider for holding assembled caps and spouts while the same are being soldered and discharged.
Fig. 26 is a section on line 26, 26 in Fig. 2.
Fig. 27 is a section on line 27, 27 in Fig. 2.
Fig. 32 is a detail view of devices for feeding solder wire.
Figures 4, 5, 6, 7, 8, 9, 10:
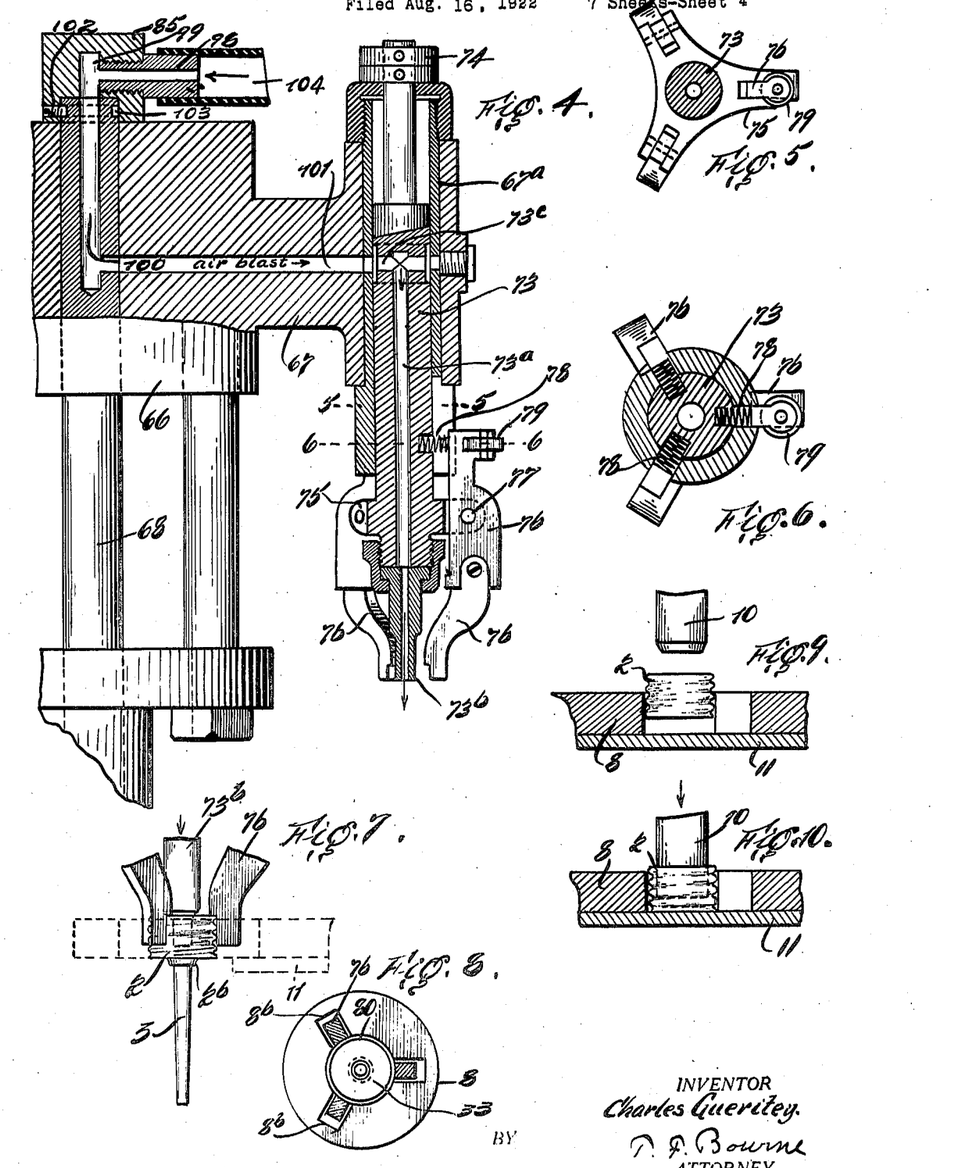
Fig. 4 is an enlarged detail section illustrating one of the cap holding means.
Fig. 5 is a section on line 5, 5 in Fig. 4.
Fig. 6 is a section on line 6, 6 in Fig. 4.
Fig. 7 is a detail of part of the cap holding means.
Fig. 8 is a detail section illustrating one of the cap retainers.
Figs. 9 and 10 are sectional details illustrating means for seating the caps in the retainers.
Figure 18:
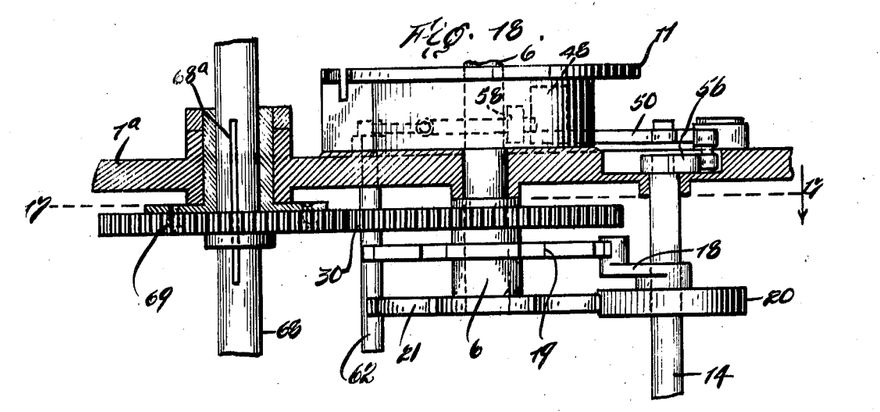
Fig. 18 is a section substantially on the plane of the line 18, 18 in Fig. 17.
Figure 19:
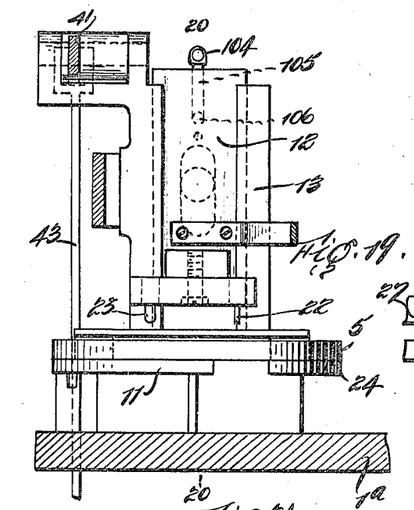
Fig. 19 is a detail front view, partly in section, illustrating cap punching devices.
Figure 20:
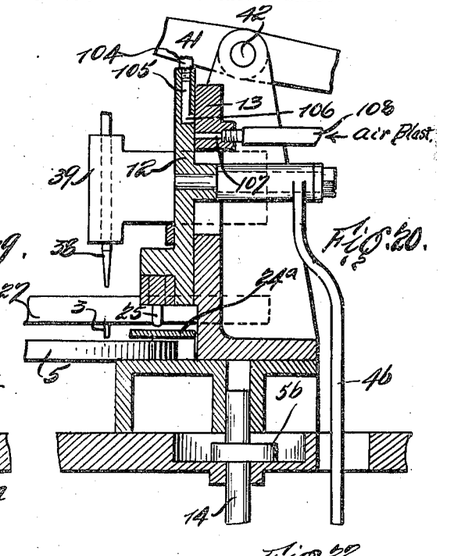
Fig. 20 is a section substantially on line 20, 20 in Fig. 19.
Figures 21, 22, 23, 24, 25:
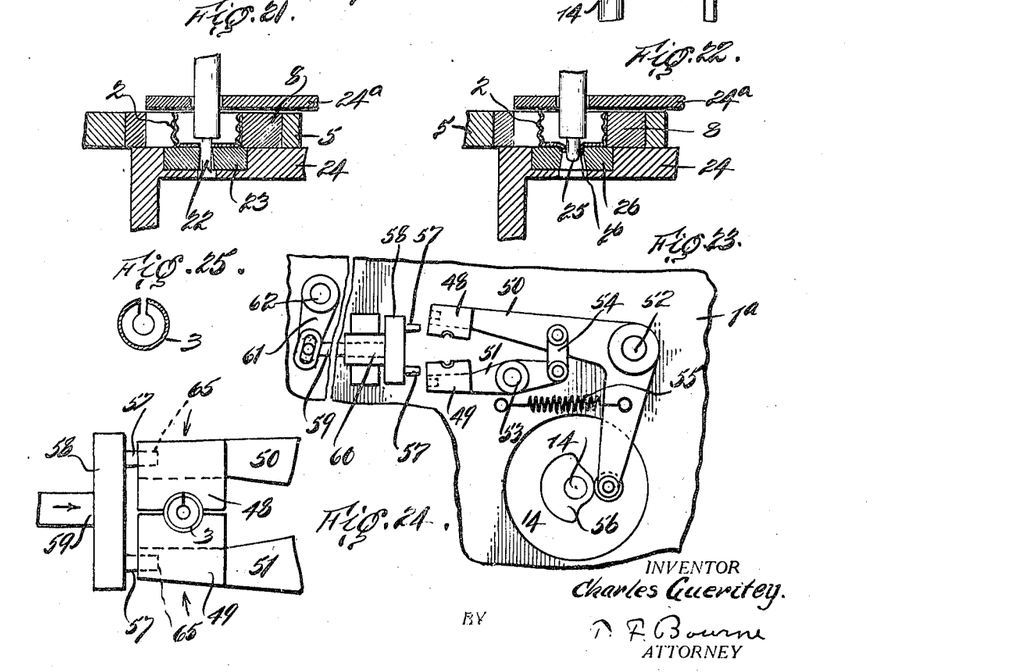
Fig. 21 is a sectional detail illustrating cap punching devices.
Fig. 22 is a similar view illustrating means for spreading the metal at the holes in caps.
Fig. 23 is a detail plan view of seam closing devices for the spouts.
Fig. 24 is a detail illustrating the seam closing devices closed.
Fig. 25 is a detail section of a spout befor its seam is closed.
Figure 28:
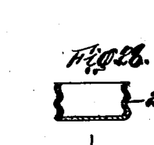
Figs. 28, 29, 30 and 31 are sectional details illustrating the cap and spout preparatory to assembly and soldering.
Figure 29:
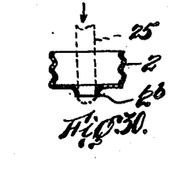
Figure 30:
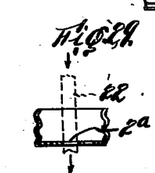
Figure 31:
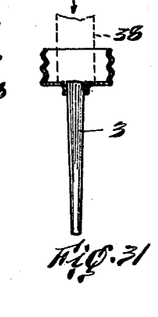

The main frame 1 of the machine may be of any suitable construction. The caps are indicated at 2 and the spouts for the caps at 3. The machine is shown provided with a chute 4 adapted to deliver the caps to a turret 5 shown carried by a shaft journaled in suitable bearings in the main frame, as upon the top $1^a$ of said frame, (Figs. 1, 2, 17 and 18). Turret 5 is shown in the form of a disk provided with spaced holes 7 in which cap retainers 8 are located. The caps may be fed by hand into the chute and a star wheel 9 journaled in the chute causes the caps to move separately by gravity through the chute (Fig. 27). The retainers 8 are shown provided with central apertures $8^a$ for the caps and with radial slots $8^b$ communicating with said apertures (Fig. 8). The caps from the chute drop partially into the apertures $8^a$ and when the turret 5 comes to rest, at the position A in Fig. 2, a plunger 10 descends and pushes the cap therebeneath into retainer 8 against a plate 11 (Figs. 1, 9 and 10). The plunger 10 is carried by a slide bar or head 12 guided in ways in a support 13 supported upon the table top 1ª, (Figs. 1, 19 and 20). The turret 5 is to be rotated step by step. I have shown a shaft 14 journaled in the main frame and provided with a gear 15 in mesh with a gear 16 on a drive shaft 17 carried by the main frame, (Figs. 1, 2, 17, 18 and 20), the shaft 14 being shown provided with an arm 18 adapted to co-operate with the star-wheel 19 of a Geneva movement that is secured upon shaft 6, whereby as the arm 18 is rotated the shaft 6 and turret 5 will be rotated step by step. A locking disk 20 secured on shaft 14 co-operates with a locking disk 21 on shaft 6 to retain the turret in set position each time it is moved a step, the disk 20 having a recess 20ª to co-operate with disk 21 when the Geneva wheel 19 is moved. When the turret comes to rest adjacent to the slide or head 12 a punch 22 carried by said head, (Figs. 19 and 21), passes through the top of the cap and, in co-operation with a die 23 carried by support 24 on the main frame, punches a hole 2ª in the cap, (Figs. 19, 21 and 29). At the next stop of the turret the punched cap is brought beneath a plunger 25 carried by slide or head 12 and which advances through said hole previously punched in the cap and in co-operation with a die 26 carried by support 24 pushes outwardly the portion of the cap around said hole 2ª, (Figs. 22, 29 and 30), producing a neck 2ᵇ on the cap, (Figs. 22 and 30). Above the dies 23 and 26 is a stripper plate 24ª having holes to receive the punch 22 and plunger 25 to resist withdrawal of caps 2 from retainers 8 when said punch and plunger recede. The punched caps are brought to rest, at the position B (Fig. 2) opposing a turret 27 which carries the spouts 3. The turret 27 is supported upon shaft 28 journaled in the main frame, (Figs. 2 and 17), which shaft is shown provided with a gear 29 in mesh with a gear 30 carried by shaft 6 (Figs. 17 and 18), whereby turret 27 will be rotated step by step in unison with turret 5.

Figure 2:
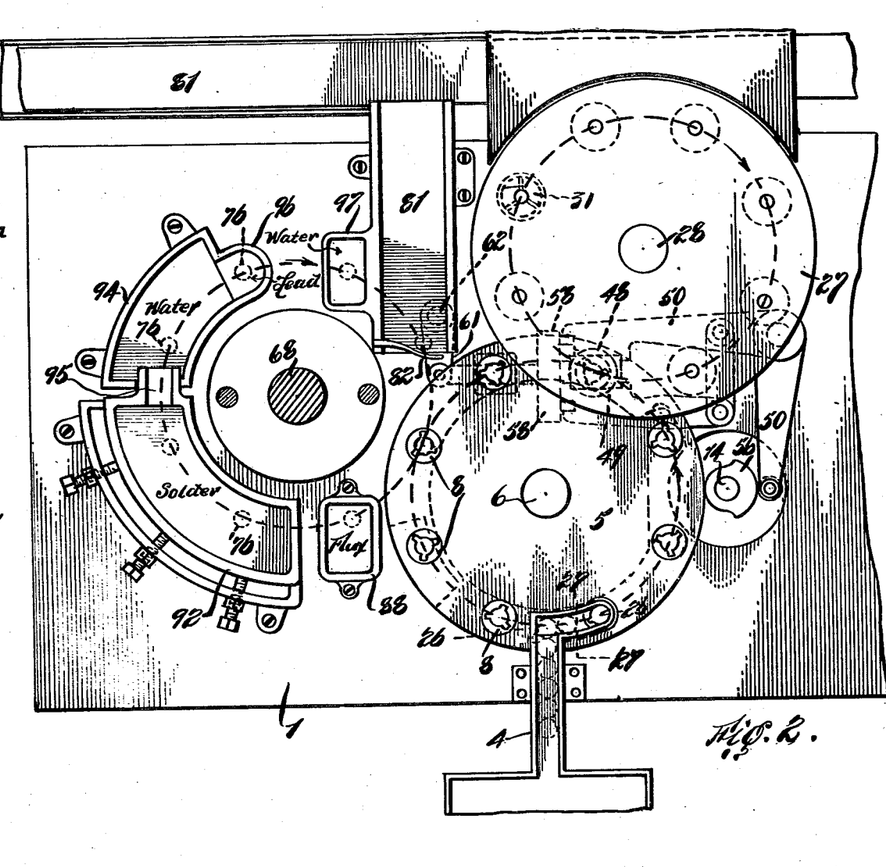
Fig. 2 is a fragmentary sectional plan view.
Figure 11:
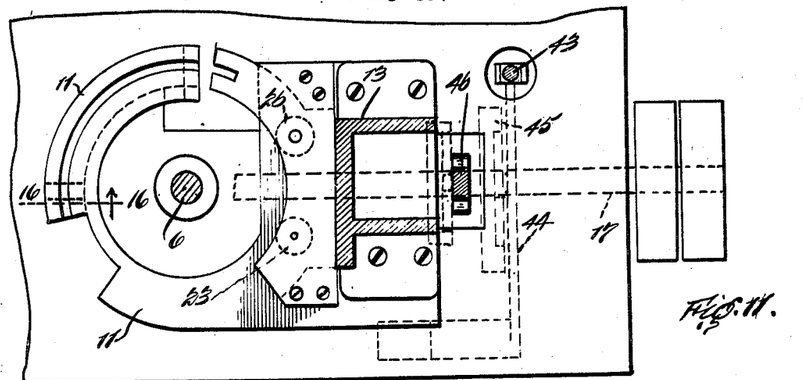
Fig. 11 is a detail section on line 11, 11 in Fig. 1.
Figures 12, 15:
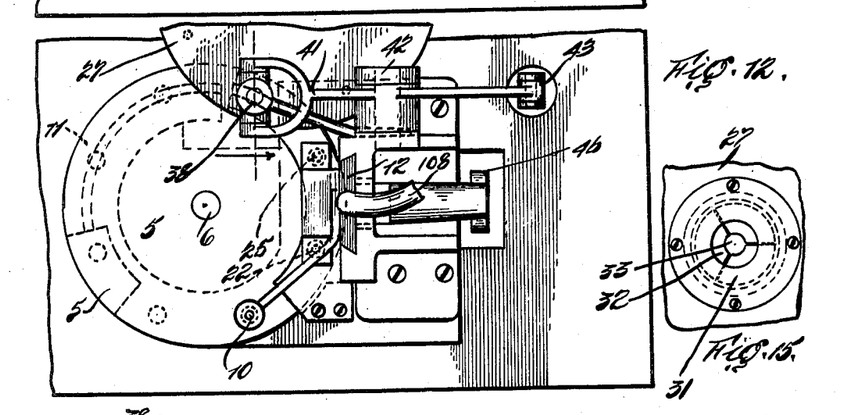
Fig. 12 is a detail plan view.
Fig. 15 is a detail plan view of a spout retainer.
Figure 13:
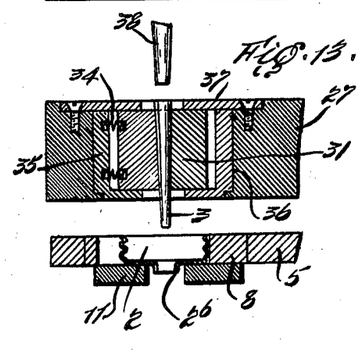
Fig. 13 is a detail sectional view illustrating means for assembling caps and spouts.
Figures 14, 16:
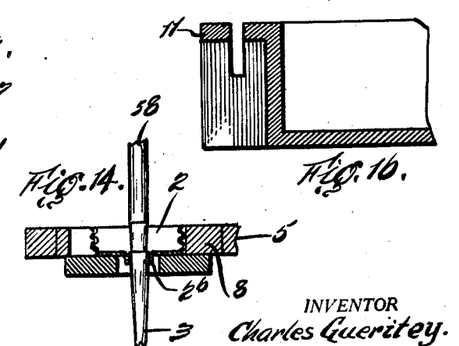
Fig. 14 is a detail section illustrating a cap and spout assembled.
Fig. 16 is a section on line 16, 16 in Fig. 11.
Figure 17:
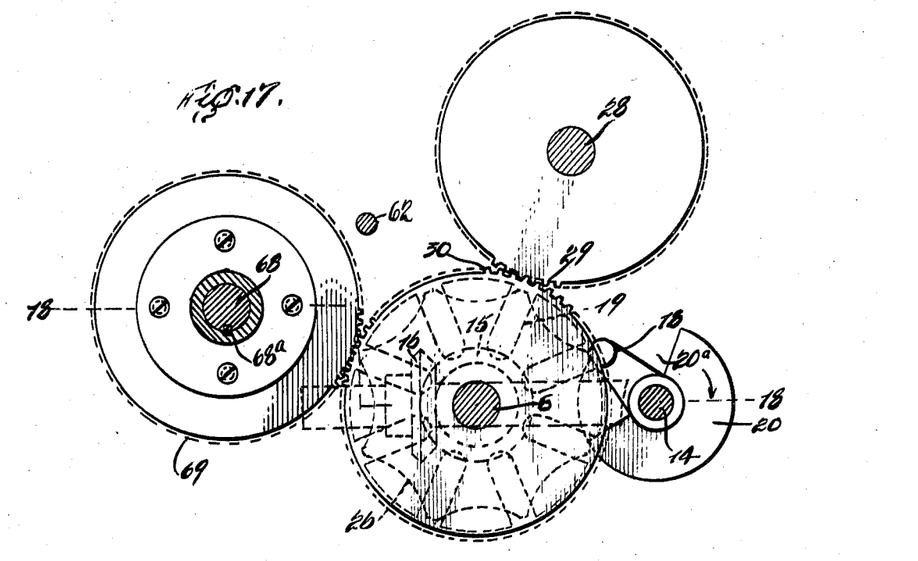
Fig. 17 is a sectional diagrammatic view illustrating driving means for the turrets and cap carrying spider, the section being taken substantially on line 17, 17 in Fig. 18.

The turret 27 is provided with chucks or retainers 31 for the spouts 3 and is shown positioned sufficiently above the turret 5 to enable the spouts to depend from turret 27 over turret 5, the marginal portions of said turrets sufficiently overlapping to register the spouts with caps beneath, as illustrated in Fig. 2. The chucks or retainers 31 are shown comprising a plurality of laterally movable members 32 having an opening 33 between them for the spouts, which members are spring pressed inwardly by means of springs 34, which members and springs are shown within a cage 35 retained in opening 36 of turret 27, a retaining plate 37 being screwed to the turret over the corresponding cage and chuck, (Figs. 13 and 15). The chucks 31 correspond in number and position to the retainers 8 of turret 5 so that each time said turrets are brought to rest a chuck will oppose a retainer. In the last named stopping position of the turrets a plunger 38, above turret 27, is caused to descend to push the spout 3 into the cap 2 beneath (Figs. 1, 13, 14 and 20). The plunger 38 is shown slidable in a guide 39 carried by support 13 and said plunger is shown movably connected at 40 with an arm 41 pivotally supported at 42 upon support 13 and pivotally connected with the depending link 43 (Figs. 1 and 12). The link 43 is shown connected to a lever 44 actuated by a cam 45 on shaft 17, (Figs. 1 and 11), whereby for each rotation of said shaft, corresponding to each step of turrets 5 and 27, the plunger 38 will be reciprocated to push a spout into a cap. The slide or head 12 is shown connected with a depending link 46 actuated by an eccentric or cam 47 on shaft 17, (Figs. 1, 12 and 20), to reciprocate said heads.

When the spouts have been assembled in the caps, which is accomplished successively by the means described, the effect of the plunger 38 in pushing the spouts into the caps is liable to cause the seams of the spouts to spread, as indicated in Fig. 25. I provide means to close the seams of the spouts as follows:—Beneath the turrets, at the point where the spouts are pushed into the caps, are located a pair of spout clamping jaws 48, 49 shown carried respectively by levers or arms 50, 51 in position to grasp the spouts, (Figs. 1, 2, 23 and 24). The levers 50, 51 are pivotally supported upon table top 1ª respectively at 52, 53 and are connected together by a link 54. A spring 55 connected with an arm of lever 50 and with the table top normally tends to cause said arms to spread apart to separate the jaws 48, 49 so that the spout will enter between said jaws. A cam 56 secured on shaft 14 co-operates with arm 50 to rock the same during rotation of said shaft, (Figs. 2 and 23). After a spout has entered between the jaws 48, 49 the latter are caused to clamp the spout to squeeze the metal thereof to close its seam. To temporarily hold the jaws in the closed position I provide pins 57 that project from a block 58 carried by a rod 59 guided in a bearing at 60, which rod is movably connected with an arm 61 on shaft 62 journaled on the main frame, (Fig. 1), which shaft is provided with an arm 63 that is operated by a cam 64 on shaft 17. When the jaws 48, 49 have closed upon a spout, the block 58 will be advanced and its pins 57 will enter recesses 65 in the jaws to temporarily retain them closed, whereupon the block 58 will be withdrawn and the jaws 48, 49 will spread apart to release the spout.

After the spouts have been successively assembled in the caps, the caps with the attached spouts are raised and carried around to be dipped in flux and solder, and are cooled. For the last named purposes I provide a rotative and reciprocative head 66 shown having spider arms 67 provided with supporting means for clamping jaws for the caps, which head is carried by a reciprocative and rotative shaft 68 guided in bearings on the main frame. The shaft 68 is provided with a gear wheel 69 in mesh with gear 30, (Figs. 17 and 18), and said shaft is also movably connected with a bellcrank lever 70 that is connected with a link 71 that is actuated by a cam 72 on shaft 48, whereby the shaft 68 and head 66 are reciprocated in unison with the operations of the turrets. A key 68$^a$ in shaft 68 connecting with gear 69 permits said shaft to be reciprocated through gear 69 and rotated thereby (Fig. 18). The clamping means for the caps are arranged as follows: Each of the arms 67 projecting from head 66 is provided with a bore 67$^a$, (Fig. 4), in which a spindle or rod 73 is secured, as by means of nut 74, which spindle or rod depends below arm 67 and is shown provided with radially disposed jaws 75 between which spaced clamping jaws 76 are pivoted at 77. Said jaws are normally pressed inwardly by springs 78 bearing against spindle or rod 73 and against said jaws to flexibly grasp the caps 2. One of the jaws 76 is shown provided with a roller 79 to engage an arm 80 located over a conveyor 81, (Fig. 3), whereby the corresponding jaw 76 will be caused to rock to release the cap so that it may drop into the conveyor. Should the arm 80 fail to actuate the clamp jaw to release the cap having a spout, a stop 82 will engage the spout and knock the cap and spout out of the jaws. Each time the head 66 descends a pair of jaws 76 will enter the slots 8$^b$ of a retainer 8 on turret 5 to grasp a cap, (Fig. 8), and on the rise of said head the cap with an attached spout will be raised from such retainer. Should the jaws fail to grasp a cap the next stop of turret 5 will advance the cap and on the next descent of head 66 a plunger 83, at the stopping point C, (Fig. 3), will descend and push the cap from the turret. The plunger 83 is shown guided by an arm 84 extending from a fitting or cap 85 located at the upper end of shaft 68, (Figs. 1, 3 and 4). The arm 84 has a depending guide 84$^a$ for plunger 83 and a spring 86 bearing against a stop 87 on plunger 83 and against the arm 84 normally tends to depress such plunger and cushion its contact with a cap.

When the caps having the attached spouts are lifted by jaws 76 above turret 5 said caps and spouts are carried around step by step and dipped successively in flux and solder and are cooled, and excess solder is removed from the spouts. A chamber or bath 88 for flux is supported upon the main frame with its top open in position to receive the spouts as head 66 descends. The bath 88 may be kept supplied with flux or acid by means of a pipe 89 extending from a tank 90 carried by a support 91 extending from frame 1, (Fig. 1). A bath or chamber 92 for solder is secured upon the frame 1 in position to receive spouts carried by the head 66 as the latter descends. The bath 92 may be of sufficient length to permit the spouts to be dipped therein more or less times during the rotation and reciprocation of head 66 (Fig. 2). The solder bath 92 may be maintained heated by means of gas burners indicated at 93 (Fig. 1). Adjacent to solder bath 92 is a water bath 94 located in position to receive the spouts after solder has been applied thereto. When head 66 descends the soldered spouts will be dipped in the water bath to cool them. At 95 is a channel extending from the solder bath over the water bath, (Figs. 2 and 3), to catch any solder that may drip from the spouts in their passage from the solder bath to the water bath. Adjacent to the water bath is a pot or bath 96 which may contain heated metal, such as lead, into which the cooled spouts will dip when the head 66 descends, to melt any solder that might remain in the spouts, since the heated lead will not stick to the spouts. At 97 is a bath or tank for water into which the soldered spouts are finally dipped to cool them after which, by the rotation of head 66, the roller 79 engages arm 80 to cause release of the soldered spouts. It will be observed that the baths are located in an arc described around the axis of head 66, so that each time the head descends a spout will be dipped in one of the baths, and so on successively.

In order to prevent excess solder remaining within the spouts a blast of compressed air is forced through a bore 73$^a$ in spindle or rod 73, and through a nozzle 73$^b$ attached to the lower end of said spindle, (Figs. 4 and 7), which nozzle is adapted to enter the cap and the adjacent end of the spout depending therefrom to direct the air blast into the spout when a cap is retained by the jaws 76. The fitting or cap 85 is shown provided with a nipple 98 that communicates with a bore 99 in said cap, which bore communicates with a bore 100 in shaft 68, the bore 100 communicating with a bore 101 in each arm 67 of head 66, (Fig. 4). The bore 101 communicates with the bore 73$^a$ of the corresponding rod 73 through transverse bore 73$^c$ therein, (Fig. 4). The cap 85 does not rotate with head 66 and shaft 68 but is journaled on the shaft and retained by means of a set screw 102 that enters an annular groove 103 at the upper end of shaft 68. The nipple 98 is connected by a flexible hose 104, (Figs. 1 and 4) with means to control the blasts of compressed air, for which purpose the hose 104 is connected with a bore 105 in head 12, which bore through its port 106 is adapted to receive air in a bore 107 in support 13, to which bore a hose 108 is attached, said hose being adapted to receive air under pressure from any suitable source, (Figs. 19 and 20). The arrangement is such that each time head 12 descends, its port 106 will receive air from bore 107 to be conducted by hose 104 to bore 100 to be blown through the nozzles carried by jaws 76, at which time the nozzles will be above the baths, and on the rise of head 12 the air blast will be cut off.

The solder may be supplied to bath 92, as required, by any suitable means. I have shown solder wire 110 fed through a guide tube 111 terminating over bath 92, said tube being carried by an arm 112 secured to frame 1, (Figs. 3 and 32). Feed rolls pivotally carried by arm 112 feed the solder. A ratchet wheel 115 secured to the pivot of roll 113 is actuated by a pawl 116 pivotally carried by a rock arm 117, shown journaled on the pivot of roll 113 and is pivotally connected by a link 118, with an arm 119 that extends from cap 85, (Fig. 3). When the head 66 reciprocates the pawl 116 will cause step by step feeding of the solder wire, which will feed into the molten solder in bath 92 and will melt therein.

The operation may be described as follows:—The caps being applied successively in the retainers 8 of turret 5 and the spouts applied in the chucks or retainers 31 of turret 27, as the turrets rotate, the heads 12 and 66 will descend and rise at each stop of the turrets, whereby caps are successively punched, their necks 2b produced and the spouts pushed into the necks of the caps, so that when the machine is operated a cap and a spout assembled therewith will be in position to be removed from the turret 5 at each descent of head 66. Upon the rise of head 66 a cap and attached spout will be lifted from turret 5 and rotated away from such turret so that on succeeding descents of head 66 the spouts will be dipped in the flux, the solder, the water bath 94, the lead bath 96, and the water bath 97, and the completed soldered spout will be released. The dipping of the spouts into the solder will be sufficient to enter the necks 2b in the solder so that the latter will solder the spouts and caps together as well as soldering the seams of the spouts.

My improved machine will be found expeditious and accurate in assembling and soldering spouts and caps. It will be evident that, while I have referred to assembling together caps and spouts and soldering the same, the machine is adapted to assembling and soldering articles other than caps and spouts by suitably organizing the parts for such articles.

My invention is not limited to the details of construction set forth as the same may be varied, within the scope of the appended claims, without departing from the spirit of my invention.

Having now described my invention, what I claim is:—

1. The combination of means to supply caps and spouts, means to successively assemble the caps and spouts together, and a bath of molten solder adapted to receive said articles, with means to successively remove the assembled caps and spouts from the second named means and dip them in said molten solder.

2. The combination of means to support caps, means to puncture the caps, means to support spouts, means to insert the spouts in the punctured caps and means to remove the caps and spouts from the last named means and dip them successively in flux and molten solder.

3. The combination of means to support caps, means to puncture the caps, means to press outwardly the material at the puncture of the caps, means to support spouts, means to insert the spouts in the punctured caps and means to remove the caps and spouts from the last named means and dip them successively in flux and molten solder.

4. The combination of a turret having means to retain caps, a second turret having means to retain spouts, means to transfer the spouts from the second named turret to the caps, means to remove the assembled caps and spouts from the first named turret and insert the spouts successively in flux and in molten solder, and means to rotate said turrets step by step.

5. The combination of a turret having means to retain caps, means to puncture caps in the turret, a second turret having means to retain spouts opposing caps in the first named turret, means to transfer the spouts from the second named turret to the caps successively, means to rotate said turrets step by step, means to remove caps and spouts from the first named turret and insert them successively in flux and in molten solder, and means to rotate said turrets.

6. The combination of a turret having means to retain caps, means to puncture caps in the turret, a second turret having means to retain spouts opposing caps in the first named turret, means to transfer the spouts from the second named turret to the caps successively, means to close the seams of the spouts, means to rotate said turrets step by step, means to remove caps and spouts from the first named turret and insert them successively in flux and in molten solder, and means to rotate said turrets.

7. The combination of a turret having means to retain caps, a reciprocative head having means to puncture the caps in the turret, a second turret provided with means to retain spouts opposing caps in the first named turret, means to assemble the caps and spouts together, means to remove the caps and spouts from the corresponding turret and insert them successively in flux and in molten solder, and means to rotate said turrets.

8. The combination of a turret having means to retain caps, a reciprocative head having means to puncture the caps in the turret, a second turret provided with means to retain spouts opposing caps in the first named turret, means to assemble the caps and spouts together, a reciprocative plunger to insert the spouts in the caps, means to remove the caps and spouts from the corresponding turret and insert them successively in flux and in molten solder, and means to rotate said turrets.

9. The combination of a turret having means to retain caps, a reciprocative head having means to puncture the caps in the turret, a second turret provided with means to retain spouts opposing caps in the first named turret, means to assemble the caps and spouts together, a reciprocative plunger to insert the spouts in the caps, means to close the seams of the spouts, means to remove the caps and spouts from the corresponding turret and insert them successively in flux and in molten solder, and means to rotate said turrets step by step and reciprocate the last named means in unison with the rotation of the turrets.

10. The combination of a turret having means to retain caps, a reciprocative head provided with means to seat the caps in said turret and to puncture the caps in the turret, a second turret provided with means to retain spout opposing caps in the first named turret, means to assemble the spouts and caps, means to remove the caps and spouts from the corresponding turret and insert them successively in flux and in molten solder, and means to rotate said turrets step by step and to reciprocate the last named means in unison with the rotation of the turrets.

11. The combination of means to assemble articles together, with a rotative and reciprocative head provided with jaws to grasp said articles, to remove them from the assembling means, means to reciprocate and rotate said head step by step, a bath for flux and a bath for molten solder opposing said jaws to successively receive the articles carried thereby, and means to release the articles from said jaws.

12. The combination of means to assemble articles together, with a rotative and reciprocative head provided with jaws to grasp said articles, means to reciprocate and rotate said head step by step, a bath for flux and a bath for molten solder opposing said jaws to successively receive the articles carried thereby, means to release the articles from said jaws, and means to blow compressed air through said articles after they are soldered.

13. The combination of means to assemble articles together, a reciprocative and rotative head provided with radial arms, jaws carried by said arms adapted to grasp said articles, means to reciprocate and rotate said head step by step to remove the articles from the assembling means, a bath for flux and a bath for solder opposed to said jaws, and means to release articles from the jaws.

14. The combination of means to assemble articles together, a reciprocative and rotative head provided with radial arms, jaws carried by said arms adapted to grasp said articles, means to reciprocate and rotate said head step by step, to remove the articles from the assembling means, a bath for flux and a bath for solder opposed to said jaws, means to release articles from the jaws and means to blow blasts of air intermittently through articles held by said jaws.

15. The combination of means to assemble articles together, a reciprocative and rotative head provided with radial arms, rods carried by said arms and provided with jaws to grasp articles, said rod and arms having communicating bores for air, means to conduct air to said bores, means to intermittently supply air to the last named means, a bath for flux and a bath for molten solder opposing said jaws, and means to release articles from said jaws.

16. The combination of means to assemble articles together, a reciprocative and rotative shaft provided with a head having radially disposed arms, means to reciprocate and rotate said shaft, said arms and shaft having communicating bores, a cap connected with said shaft and having a bore communicating with the bore of said shaft, means to permit said shaft to rotate independently of said cap, means to supply the bore of said cap intermittently with compressed air, said arms being provided with spindles having bores, jaws carried by said spindles to grasp said articles, a bath for flux and a bath for molten solder opposing said jaws, and means to release articles from said jaws.

CHARLES GUERITEY.